Figure 11:
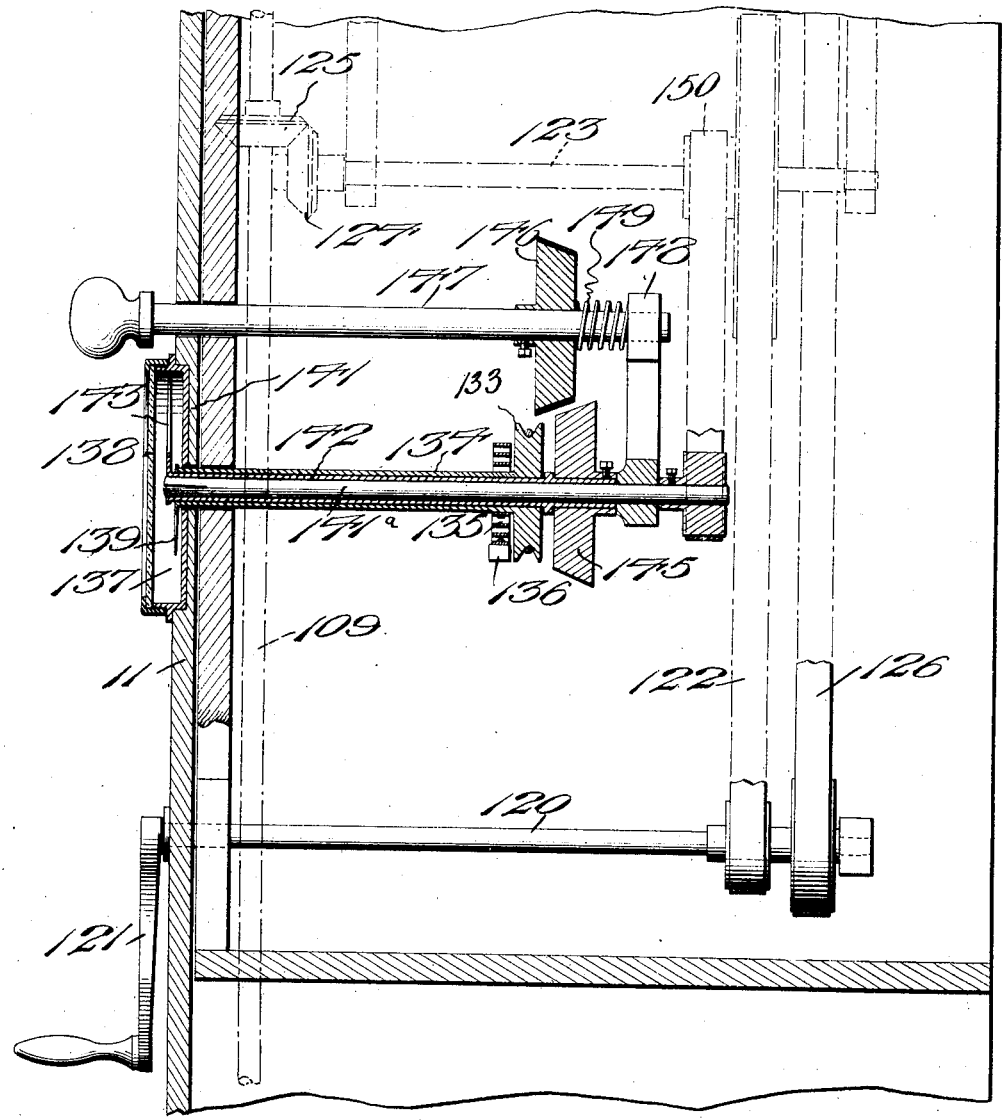

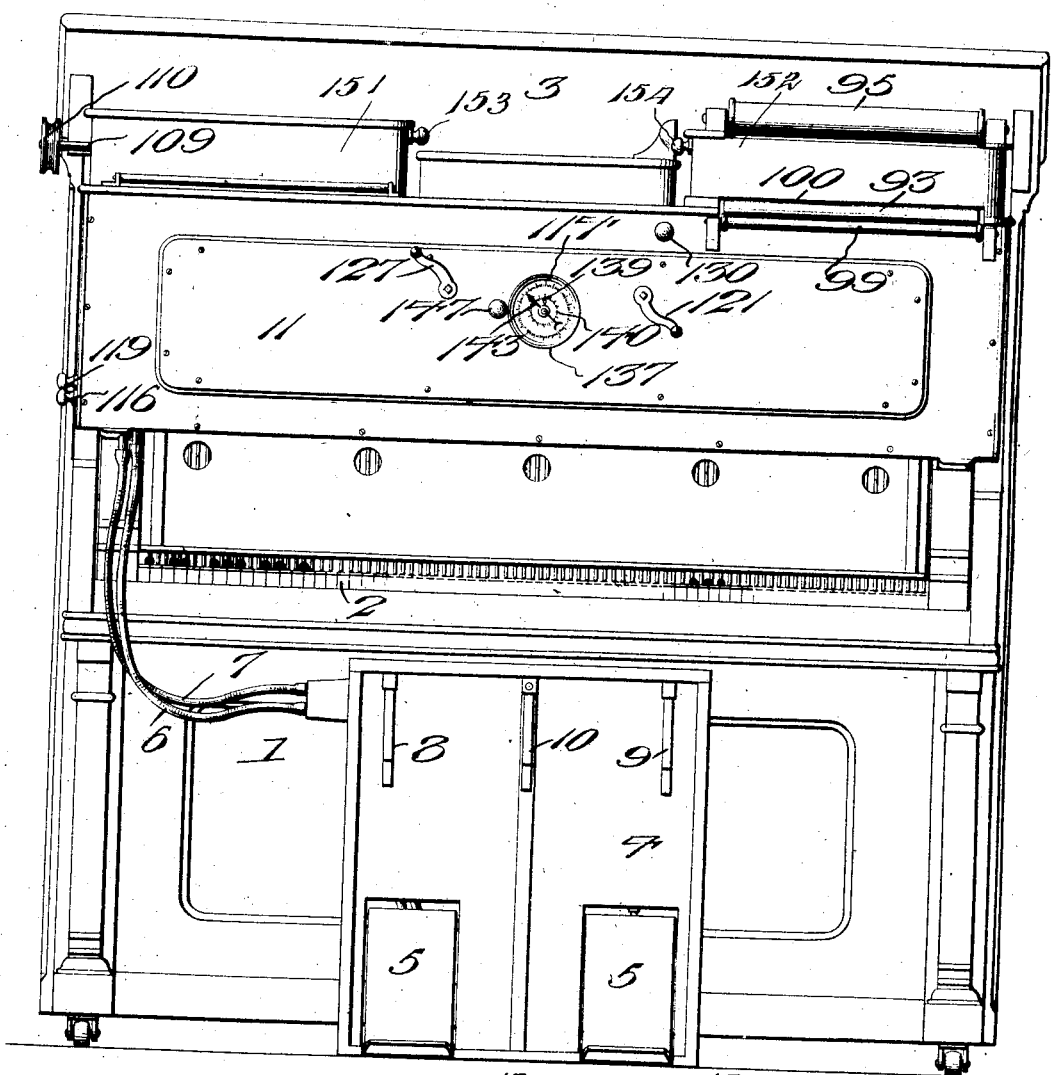

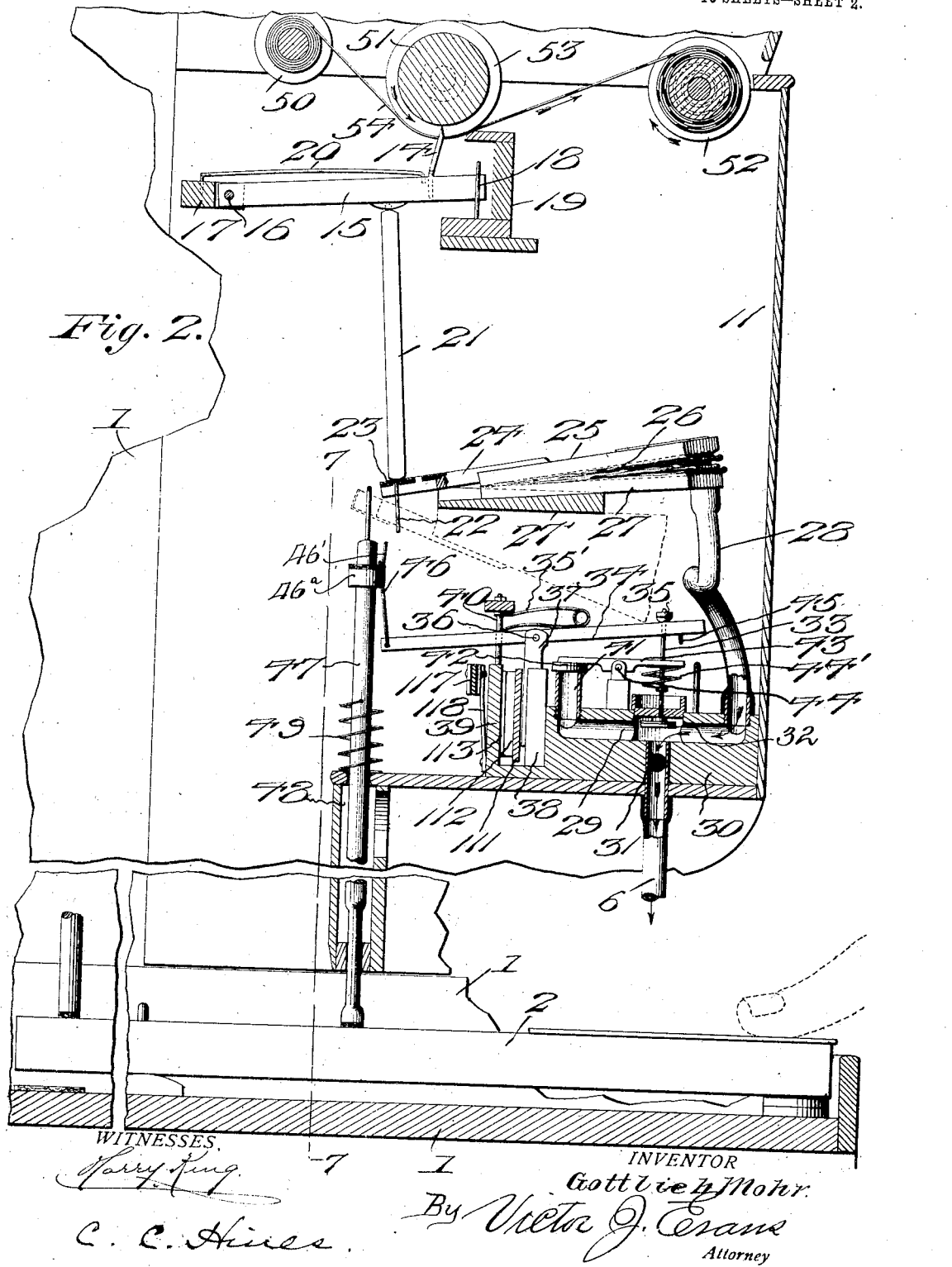

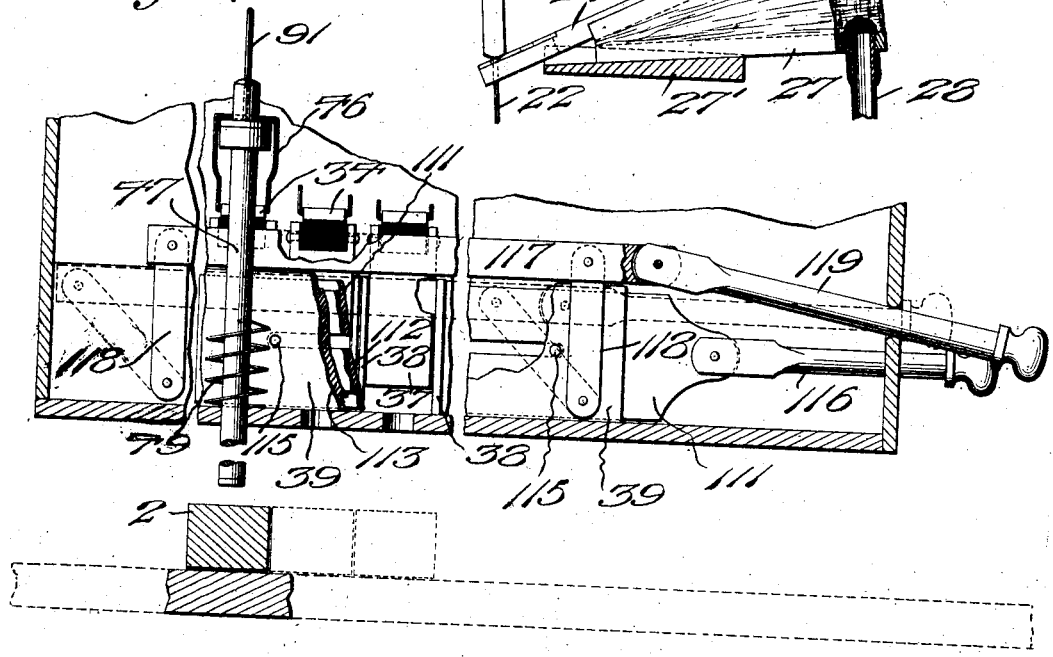

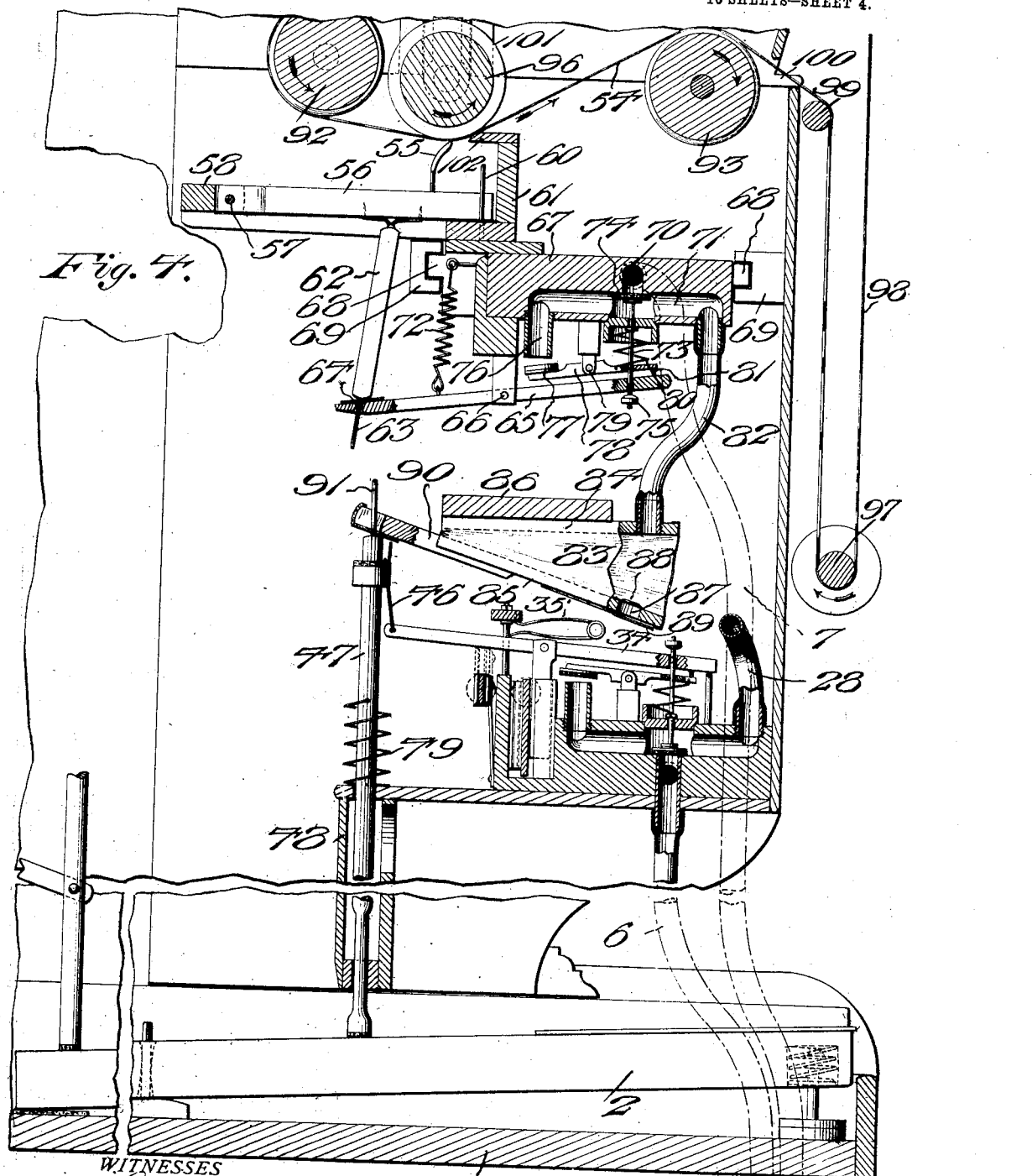

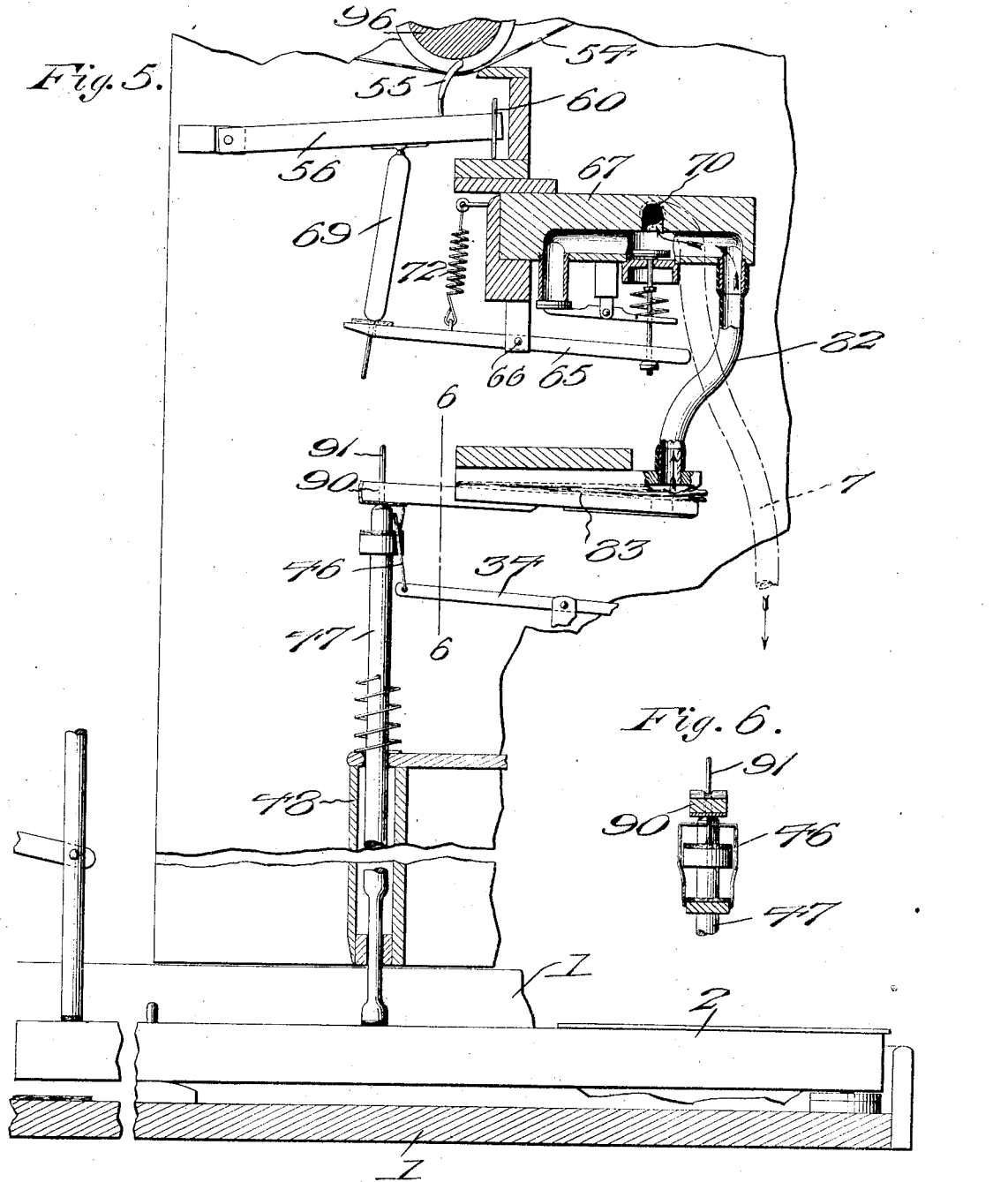

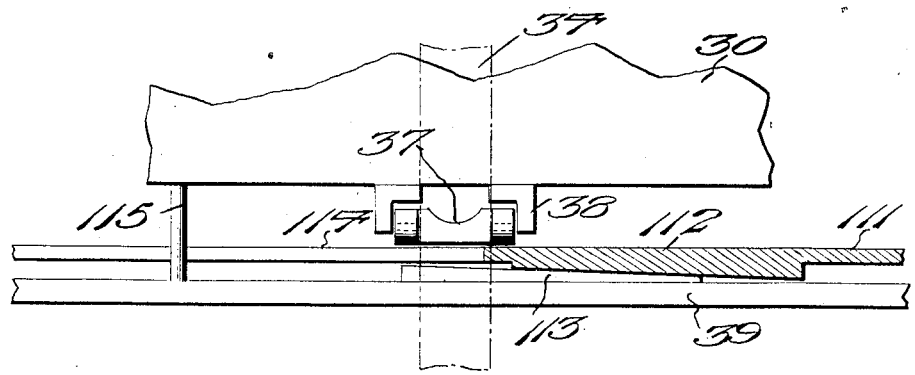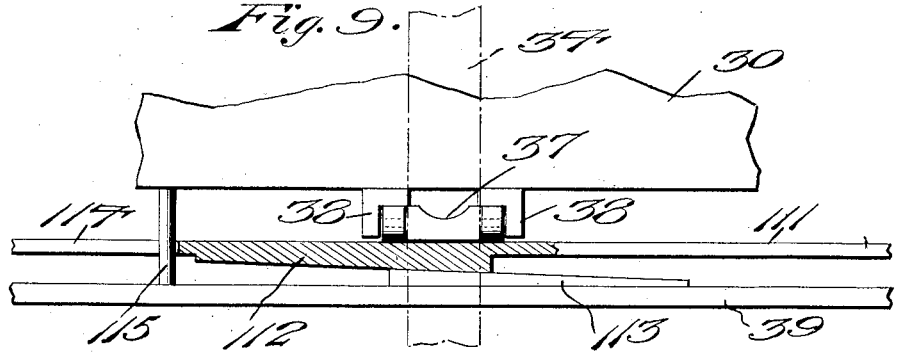

No. 850,668. PATENTED APR. 16, 1907.
G. MOHR.
COMBINED RECORD MAKING AND SELF PLAYING ATTACHMENT FOR PIANOS.
APPLICATION FILED FEB. 20, 1906.
10 SHEETS—SHEET 7.
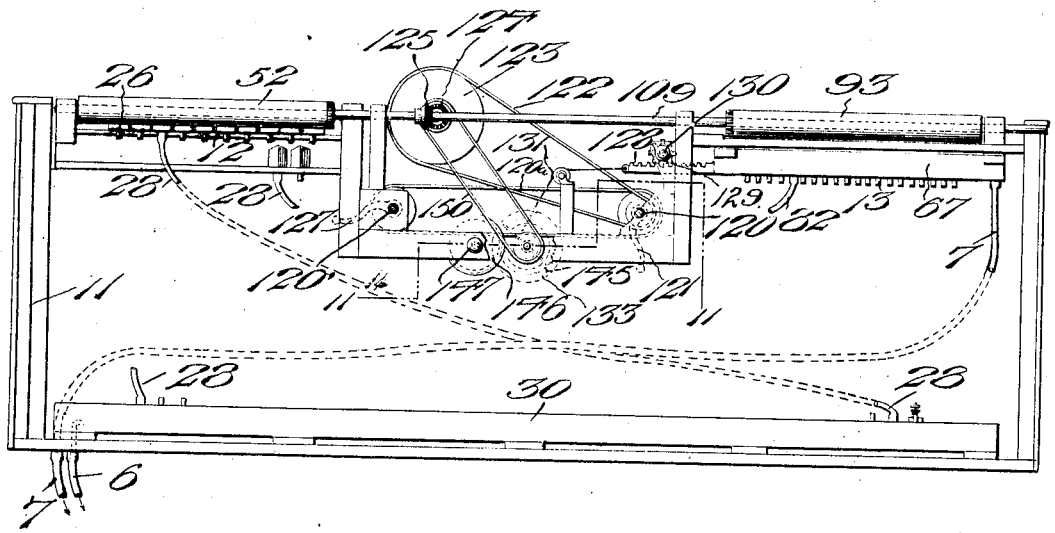
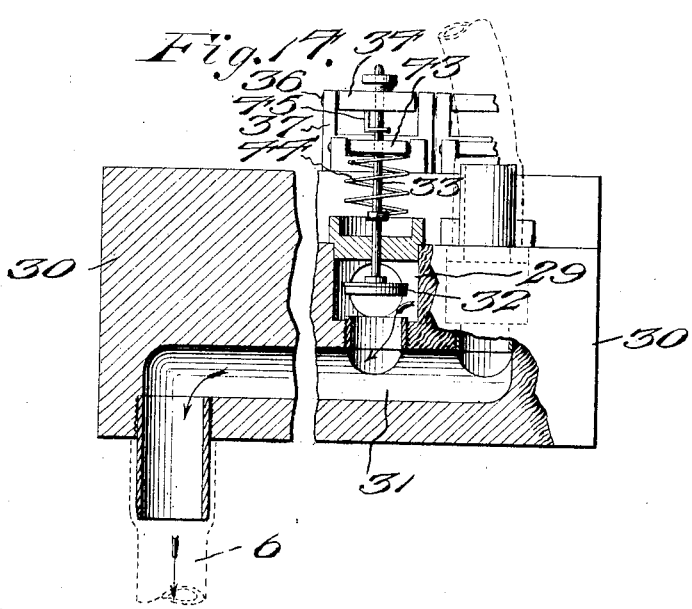
WITNESSES
INVENTOR
Gottlieb Mohr.
By Victor J. Evans
Attorney No. 850,668. PATENTED APR. 16, 1907.
G. MOHR.
COMBINED RECORD MAKING AND SELF PLAYING ATTACHMENT FOR PIANOS.
APPLICATION FILED FEB. 20, 1906.
10 SHEETS—SHEET 9.
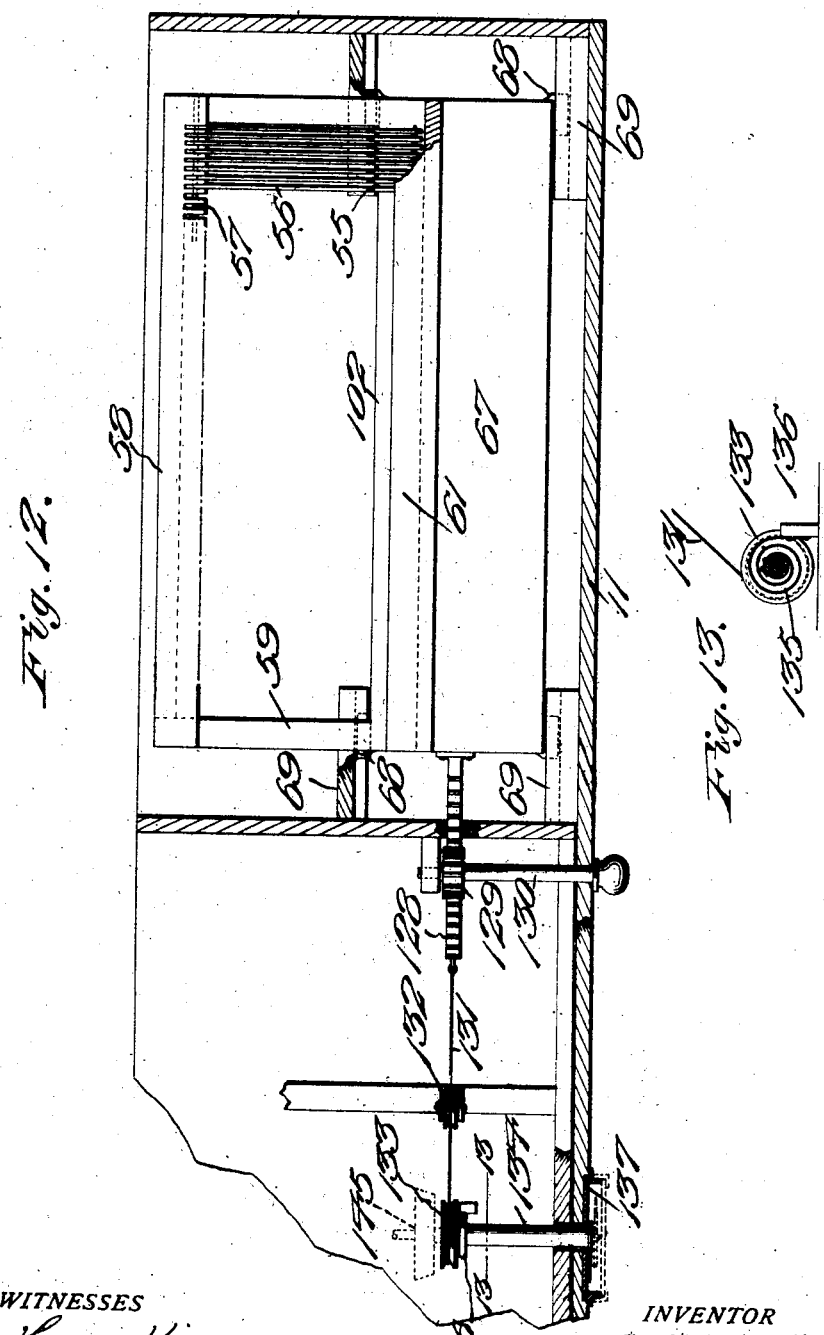
WITNESSES
INVENTOR
Gottlieb Mohr.

No. 850,668. PATENTED APR. 16, 1907.
G. MOHR.
COMBINED RECORD MAKING AND SELF PLAYING ATTACHMENT FOR PIANOS.
APPLICATION FILED FEB. 20, 1906.
10 SHEETS—SHEET 10.
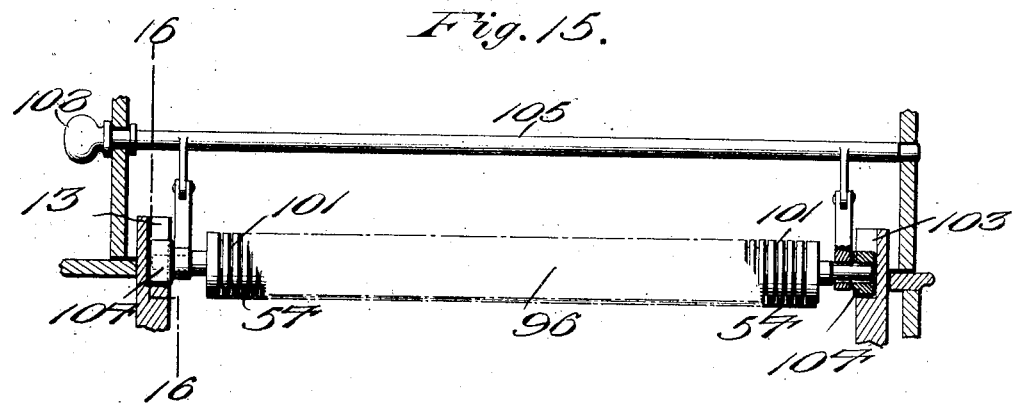
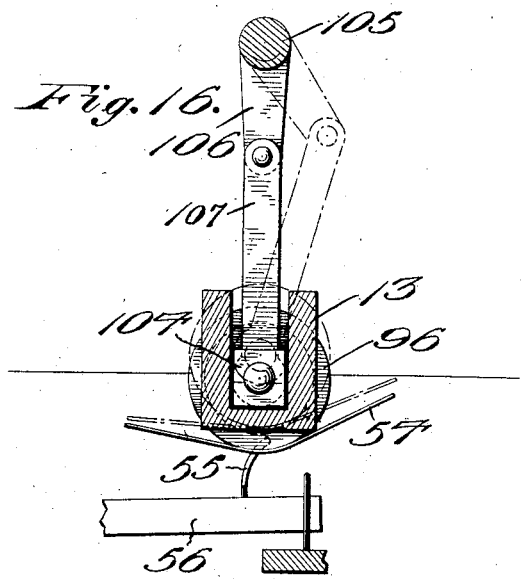
WITNESSES
Harry King.
C. C. Hiess.
INVENTOR
Gottlieb Mohr
By Victor J. Evans
Attorney

UNITED STATES PATENT OFFICE.

GOTTLIEB MOHR, OF CEDARVILLE, WEST VIRGINIA.

COMBINED RECORD-MAKING AND SELF-PLAYING ATTACHMENT FOR PIANOS.

No. 850,668.      Specification of Letters Patent.      Patented April 16, 1907.

Application filed February 20, 1906. Serial No. 302,066.

*To all whom it may concern:*

Be it known that I, GOTTLIEB MOHR, a citizen of the United States of America, residing at Cedarville, in the county of Gilmer and State of West Virginia, have invented new and useful Improvements in Combined Record-Making and Self-Playing Attachments for Pianos, of which the following is a specification.

This invention relates to a music recording and reproducing mechanism for pianos and similar key-operated musical instruments, the mechanism being of that general type adapted for the production of perforated music-sheets and the reproduction of the musical selections or compositions therefrom.

Generally stated, the objects of the invention are, first, to provide a combined recording or music-sheet making and reproducing or playing mechanism for operating the piano to play the compositions represented by the produced music-sheets which embodies the desirable advantages of simplicity of construction, inexpensiveness of production, and efficiency of operation; second, to provide a mechanism of this character which may be applied to any ordinary type of piano and thrown into and out of operation at will, so that by the simple adjustment of controlling parts the mechanism may be set for operation or rendered inoperative in order that the piano may be played in the usual way; third, to provide a construction whereby unskilled performers may, nevertheless, prepare an accurate record of any musical composition, and, finally, to produce a recording mechanism by which any number of duplicates of a record may be prepared and also to produce simple and effective pneumatic means for controlling the action of the operating parts.

With the above and other objects in view the invention consists of the novel construction, combination, and arrangement of parts hereinafter fully described and claimed, reference being had to the accompanying drawings, in which—

Figure 1 is a front elevation of a piano shown equipped with my invention. Fig. 2 is a vertical front-to-rear section through the casing of the apparatus, showing one of the sets of devices of the recording mechanism as actuated to form a perforation in the record-sheet. Fig. 3 is a similar view of the perforating device shown in Fig. 2 disposed in normal or retracted position. Fig. 4 is a view similar to Fig. 2, showing one of the sets of devices of the reproducing mechanism with the reproducing-needle in normal position. Fig. 5 is a similar view of a portion of the elements illustrated in Fig. 4, showing the needle projected and the plunger depressed to operate the piano-key. Fig. 6 is a detail section on line 6 6 of Fig. 5. Fig. 7 is a vertical transverse section, with parts broken away, taken on a plane indicated, as an example, by the line 7 7 of Fig. 2, showing the means for throwing the apparatus into and out of action, adjusting the parts to suit the positions and ranges of movement of the keys, and for locking said parts in adjusted position. Figs. 8 and 9 are sectional plan views of the locking device with the parts thereof in locking and unlocking position. Fig. 10 is a front elevation of the rollers and coöperating parts of the recording and reproducing mechanisms as they appear with the front of the casing and tubes removed, the banks of operating devices of said mechanisms being generally indicated and two of the connecting-tubes being shown in dotted lines. Fig. 11 is a horizontal section, on an enlarged scale, taken on line 11 11 of Fig. 10. Fig. 12 is a horizontal section showing the means for adjusting the reproducing mechanism to play in any key. Fig. 13 is a detail section taken on line 13 13 of Fig. 12. Fig. 14 is a vertical longitudinal section through the end portions of the main suction-box, the view representing the intermediate portion of the box broken away and one of the end portions partly in elevation and with one of the valve devices appearing partly in section and partly in front elevation. Fig. 15 is a sectional elevation showing the grooved platen-roller of the reproducing mechanism and the means for adjusting the same. Fig. 16 is a section on line 16 16 of Fig. 15. Figs. 17 and 18 are detail plan views of the recording and reproducing needles and their carrier-levers. Fig. 19 is a diagrammatic view showing the mode of supporting, guiding, and tensioning the traveling music-sheet which controls the action of the reproducing mechanism. Fig. 20 is a vertical transverse section through the housing of one of the sets of feed-rollers, showing the pressure-roller and means for adjusting the same.

Referring now more particularly to the drawings, the numeral 1 designates a piano of the upright type, 2 its bank of keys, and 3 the usual upwardly-swinging lid of the top of the piano-casing, which closes the open space in the piano-casing above the key-levers.

Arranged at the front of the piano and suitably fixed in position is a box or casing 4, in which are suction-bellows operated by a pair of pedal-levers 5. From these bellows extend flexible tubes 6 and 7, leading to the suction-boxes of the recording and reproducing apparatus, as hereinafter described. The said box or casing 4 supports knee-swells 8, 9, and 10, movable, respectively, to the left, right, and in both directions to operate the pedal-rods, with which they are connected in any suitable manner. I have not deemed it necessary to specifically show or describe these elements, as the construction may be that in common use and as such elements do not constitute, except so far as the suction-bellows enter into the general combination as one means for producing a suction action, any part of the present invention.

The recording and reproducing mechanism is supported by and inclosed within a suitable frame or casing 11, which is of such form as to rest upon the piano-casing and occupy the space above the key-levers normally occupied by the lid 3 and left vacant when the latter is thrown back. This casing 11 may accord in style and finish with the piano-casing and may be supported by its own weight or fastened to the piano-casing in any preferred manner.

Arranged within the casing 11, and preferably at the opposite ends thereof, are banks of recording and reproducing devices, generally denoted (see Fig. 10) by the reference-numerals 12 and 13, each bank embodying in practice sets of devices equal in number to the piano-keys 2, one for each key. In the present instance I have only shown a sufficient number of these devices to illustrate the principle of the invention, owing to the confusion and lack of clearness liable to arise from the illustration of a multiplicity of parts. Suffice it to say that a recording and a reproducing device are provided for each key, and through the action of controlling means hereinafter specifically described each recording device is adapted to be operated by its respective key when the latter is manually depressed, while, on the contrary, the reproducing device is designed to effect a mechanical depression or manipulation of the key.

Each note-recording device consists of a perforating pin or member 14, carried by a vertically swinging or vibrating lever 15, pivoted at its rear end, as at 16, upon a support 17 and movable at its forward or free end between guide-pins 18. The pins 18 are carried by a support 19, on which the said free end of the lever rests when in lowered position, in which position it is normally held by a spring 20, arranged between the lever and its support. A pitman or connecting bar or rod 21 is pivotally attached at its upper end to the lever and depends therefrom and is provided at its lower end with a pin 22, pivotally engaging an aperture 23 in an arm 24, fixed to the hinged end of the movable side or member 25 of a spring-expanded bellows or pneumatic actuator 26, the opposite side 27 of which is fixed to a stationary bar or bracket 27'. The part 25 thus has pivotal motion, so that upward motion will be transmitted to the arm, rod, and lever when the bellows is collapsed, while upon the expansion of the bellows to its normally extended condition the arm 24 will swing downward and permit the lever 15 to be retracted by spring 20, the projected and retracted positions of the parts being, respectively, shown in Figs. 2 and 3. The bellows is in communication through a flexible tube 28 with a duct or channel 29 in a suction-box 30, common to all the recording devices, which suction-box is provided with a longitudinal passage 31, connecting with the tube 6, and is formed with a series of such ducts 29, with which the tubes of the recording devices communicate, each of which ducts is governed by valve mechanism, which I will now describe. A valve 32 normally closes communication between the duct 29 and passage 31, and consequently between said passage and the bellows, and is attached to an exteriorly-projecting sliding stem 33, extending loosely through the front arm of a lever 34 and provided above the lever with a contact-head 35. The lever is adapted to be tilted to pull valve 32 open by means of a spring 35' and is centrally fulcrumed, as at 36, upon a bracket 37, slidable vertically in guides 38, disposed opposite a bar 39, on which is a post 40, to which one end of the spring 35' is attached, the other end of said spring being arranged to exert downward pressure on the rear arm of the lever. The duct 29 has an air-inlet 41, adapted to be closed by a relief-valve 42, carried by the rear arm of a lever 43, intermediately fulcrumed, as at 44, upon the suction-box. The front arm of said lever 43 has an aperture through which the valve-stem 33 slides and is connected to said stem by a spring 44', whereby the valve 42 is held closed when valve 32 is open. A pin 45 is provided upon the lever 34 to engage the lever 43 and force the valve 42 open when the valve 32 is closed. The rear arm of the lever 34 is pivotally connected by a bail-shaped link 46 with a plunger or stem 47, sliding vertically in a suitable guideway 48 and bearing at its lower end against the upper surface of the underlying piano-key 2. The bail 46 may be pivotally connected with the plunger in any preferred manner, as by arranging its bight or return portion to rest upon a head 46ª on the plunger and to be held from disconnection, so as to have a limited loose up-and-down play, by a stop or guide pin 46'. A spring 49 of insufficient strength to depress the plunger against the resistance of the underlying key 2 is provided to force the plunger downward when the key is manually or automatically depressed, such resistance of the key being greater than the combined pressures of the springs 35' and 49, so that the plunger will be held in elevated or normal position directly by the key, while the plunger, through the connecting-bail 46, will hold the lever 34 in a normally horizontal position against the resistance of spring 35', in which position of the lever the valve 32 will be held closed. The plunger performs two functions. It is adapted when the key 2 is manually depressed to be forced downward to follow the movement of the same by the spring 49 and to thereby move over from the bail 46, leaving the rear arm of lever 34 free to be depressed by spring 35', whereby the lever will be tilted to the position shown in Fig. 2, thus elevating and causing the front arms of said lever to engage the head 35 and lift the valve 32, whereupon the spring 44' closes the valve 42, thereby connecting the bellows 26 with the passage 31, connected with the exhaust-tube 6, the air being thus exhausted from the bellows, which collapses and projects the lever 15 and perforating-needle 14 upward, as will be readily understood. The closing of the valve 42 in this operation prevents air from entering the duct 29, so that the bellows 26 may be quickly and efficiently collapsed by the withdrawal of air from the passage 31 by the action of the operating-bellows manipulated by the pedal-levers 5. When the key 2 is released and returns to normal position, the plunger 47 will be forced upward thereby and will accordingly draw upward on bail 46 and tilt the lever 34 back to horizontal position to close the valve 32 and open the valve 42, by which the duct 29 will be thrown out of communication with the passage 31, and air may enter the bellows via the inlet 41, duct 29, and tube 28 to permit the same to distend and the lever 15 to be retracted to normal position. The plunger 47 thus controls, as one of its functions, the coöperating perforating-needle, through the bellows and valve mechanism just described, to cause the perforating-needle to be projected when the key 2 is depressed and to permit it to return to normal position when said key is released. In its other function the plunger 47 is forcibly depressed through the action of the coöperating actuating means of the reproducing mechanism, so that said plunger will mechanically depress and operate the key 2, as hereinafter described.

Arranged above the perforating devices of the recording or record-making mechanism are rolls 50, 51, and 52, journaled at their ends in suitable open bearings (not shown) on the upper portion of the casing 11 to permit of their convenient application and removal. The web or paper or other suitable material 54, from which the perforated sheets or records are formed, is wound at one end about the roll 50, thence extends forwardly beneath the roll 51, and is suitably connected at its free end to the roll 52 to wind thereon as it is fed forward by the action of said roll 52, which is operated in a manner hereinafter described. The rolls 50 and 52 are flanged at their ends to prevent shifting of the web thereon, while the roll 51 is provided with annular grooves or corrugations 53, disposed above the respective perforating-needles 14 and equal in number thereto. As each needle 14 is projected upwardly it passes through the paper while the latter is being fed forward and enters the coöperating groove 53, the action of the paper in its feeding movement thus causing a perforation or slit to be cut therein, which perforation or slit will vary in length according to the period the key 2 is held depressed and commensurate with the length of the note represented thereby.

In the production of a music sheet or record the performer plays the selection or composition in the usual way by manipulating the keys of the piano, and the perforating-needles, governed by the action of said keys and the interposed operating devices, are projected as the respective keys are depressed and forced through the sheet 54, thus forming therein perforations or slits representing the notes played, so that a complete record of the composition played will be produced for subsequent use for a mechanical reproduction of said composition by the reproducing or mechanical playing mechanism. After a record has been made all that portion of the sheet 54 containing the perforations is separated from the body of the roll of paper and the ends of the severed sheet pasted to form an endless perforated band or web, which is then transferred for use when desired to the guiding-rolls of the reproducing mechanism.

Each note-reproducing device of the reproducing mechanism consists of a pin or needle 55 of proper form and construction to enter the perforations in the music-sheets without enlarging or mutilating the same, said needle being mounted upon the free end of a vertically tilting or vibrating lever 56, pivotally mounted, as at 57, upon the rear bar 58 of an open oblong shifting frame 59 and movable at its forward end between guide-pins 60, carried by the forward bar 61 of said frame. The lever 56 is pivotally connected to the upper end of a pitman bar or rod 62, provided at its lower end with a pin 63, pivotally engaging an aperture 64 in a valve-controlling lever 65, intermediately fulcrumed, as at 66, upon the shifting frame.

The frame carries a suction-box 67, rigidly secured thereto in any suitable manner, and said suction-box and frame are provided with guide-flanges 68, arranged to slide in a direction longitudinally of the casing 11 in guideways 69, suitably fastened to said casing, the range of movement of the frame and suction-box being equivalent to or little greater than that occupied by a set of the piano-keys representing an octave, so as to provide for the reproduction of the composition in any key, as hereinafter described. The suction-box 67 is provided with a longitudinal suction-passage 70, communicating at one end with the suction-tube 7, leading from the main exhaust-bellows operated by the pedal-levers 5, and in said suction-box are also formed transverse ducts 71, equal in number to the note-reproducing devices and one for each of said devices. The rear arm of the lever 65 is connected with a contractile spring 72, fixed at one end to the frame 59 and at its other end to lever, while the forward arm of said lever 65 is formed with an aperture for the passage of a stem 73, extending into said duct and provided at its inner end with a valve 74 to close communication between the same and the passage 70 and having at its outer end an abutting head 75, adapted to be engaged by said lever when the lever 56 moves upwardly to open the valve 74, and thus connect the passage 70 and duct 71. The duct 71 is provided at one end with an air-inlet 76, controlled by a valve 77, mounted upon one (the rear) arm of a rocking lever 78, intermediately pivoted at 79 upon the suction-box and provided in its front arm with a perforation for the passage of the stem 73, which is adapted to slide therein. A spring 80 surrounds the stem 73 and is fixed at one end thereto and at the other end to the adjacent arm of the lever 78 to hold the valve 77 closed when the valve 74 is open, and upon the forward end of the lever 65 is provided a contact-pin 81, adapted to engage the lever 78 and force the valve 77 open when the valve 74 is closed. The other end of the duct 71 is connected by a flexible tube 82 with a bellows or pneumatic key-operating device 83, the said bellows having fixed and movable sides or members 84 and 85 hingedly connected at their rear ends in any suitable manner, the stationary member 84 being rigidly secured to a suitable bracket or support 86. When the needle 55 registers with a perforation in the music-sheet and is projected upwardly therethrough through the action of the spring 72, the valve 74 will be opened to connect the duct 71 with the air-exhaust passage or suction-passage 70, while the valve 77 will be closed to cut off communication between said duct and the atmosphere, and as a result the air will be sucked or drawn from the bellows 83 through the tube 82, whereby the movable member 85 will be drawn up against the fixed member 84 and the bellows collapsed, as will be readily understood. This action, as hereinafter described, will depress the plunger 47, actuated by said bellows, to operate the piano-key to sound the note represented by the perforation through which the needle 55 projects. When the end of the perforation in the music-sheet is reached, the web or connecting portion between said perforation and the next adjacent perforation in line therewith will force the needle 55 downward against the action of the spring 72, and the needle will ride up on the under side of the music-sheet until the next adjacent perforation in the line of travel of the music-sheet is reached, when the operation above described will be repeated. When the needle 55 is projected downward in the manner stated, it will be apparent that the lever 65 will be moved to the position shown in Fig. 4 from that shown in Fig. 2, whereby the valve 74 will be closed to disconnect the duct 71 from the passage 70, and at the same time the pin 81 will engage and operate the lever 78 to open the valve 77, and thereby again permit air to enter to follow the bellows 83 and permit the same to expand. This is the action whenever the needles of the several reproducing devices move into and out of the lines of perforations in the music-sheet, and it will thus be seen that when the needle of any reproducing device is out of register with a perforation the operating mechanism thereof will be thrown out of action to permit the piano-key to return to its normal position.

The movable member 85 of the bellows 83 may be forced downward by a suitable contained spring or by the action of gravity and is provided with an air-inlet 87, controlled by interior and exterior flap-valves 88 and 89, the valve 88 being normally closed and the valve 89 normally open. When the air is exhausted from the bellows, the valves 88 and 89 will be respectively opened and closed to prevent access of air to the bellows through the opening 87, while when the movable member 85 drops to distend the bellows the valve 89 will open and the valve 88 will be held open by the pressure of the inrushing air until the bellows is filled, when it will automatically close. This valve mechanism is provided in addition to the valve 77 in order to secure a rapid restoration of the bellows to normal condition as soon as a piano-key is released by the plunger 47, but may be dispensed with where its provision is not found to be absolutely necessary. I may use the same construction of valve mechanism in connection with the bellows 26 of the recording mechanism, if desired.

The movable member 85 of the bellows 83, connected with the reproducing device for each key, is operatively connected with the plunger or stem 47, associated with such key, as shown, for example, in Fig. 4, from which it will be seen that the said member 85 is provided with an arm 90, having a pivotal engagement with a pin or projection 91 upon the upper end of the plunger 47, so that when the bellows is collapsed the arm 90 will swing downward and impart corresponding motion to the plunger 47 to operate the underlying piano-key 2 to sound a note represented by the perforation in the music-sheet, causing the actuation of the said note-reproducing device. When the bellows is inflated or restored to normal condition, it will be apparent that the arm 90 will move from its projected position (shown in Fig. 5) to its normal position (shown in Fig. 4) and permit the key to return to normal position and force the plunger 47 upward. It will of course be understood that the plungers 47, the valve devices for the set of bellows 26, controlled thereby and governing the passages in the suction-box 30, and the series of bellows 83, associated with the suction-box 67, are arranged above their respective key-levers, that the series of bellows 26 is disposed below the respective levers carrying the perforating-needles, and that connection is made between the respective suction-boxes 30 and 67 and the sets of bellows 26 and 83 through the medium of the flexible tubes 28 and 82, which may be of any length and disposed within the casing 11 in any preferred manner.

The perforated music sheet or record 54, produced by the recording or record-making apparatus is, as before stated, formed into an endless band or strip, which is transferred when it is desired to mechanically reproduce the composition represented thereby to the guiding and supporting rolls of the reproducing mechanism. As shown in Figs. 4 and 19, these rolls comprise lower guiding-rolls 92 and 93, upper guiding-rolls 94 and 95, a platen-roll 96, and a tension-roll 97. The record-sheet 54 passes over the rolls 94 and 95 and travels in contact with and beneath the rolls 92, 93, and 96, and at the front a portion of the record-sheet is allowed to depend at the front of the casing in the form of a loop or fold 98, which passes at its lower end around the roll 97, which is free from support and is adapted by its weight to hold the sheet taut during its feeding motion. This arrangement and mode of mounting the sheet obviates the necessity of employing a multiplicity of guiding-rolls for a sheet of some length and also the use of complicated tension mechanism. If desired, a guide rod or roll 99 (see Fig. 4) may be provided for the upper end of the looped portion 98 at the point where the record-sheet feeds through a suitable aperture 100 in the front of the casing 11.

The rolls 92, 93, 94, and 95 are preferably mounted in open bearings to facilitate their application and removal, and the roll 96, like the platen-roll 51 of the recording mechanism, is provided with annular grooves 101, corresponding in number to the note-producing devices employed and into which the reproducing-needles 56 of said devices extend when they project through the perforations in the music-sheet, as will be readily understood.

The portion 61 of the shifting frame 59 is provided with a guiding edge 102 for the lower edge of the music-sheet to insure its proper feed and to maintain it in accurate operative relation to the platen-roll 96, and the latter is adjustably mounted, as shown in detail in Figs. 15 and 16, to permit it to be raised for the convenient application and removal of a sheet and to hold the sheet applied thereto out of the path of movement of the needles 55 when the record-making mechanism of the apparatus is being independently used. To this end the frame 11 is provided with open vertical bearing-recesses 103 for the reception of vertically-adjustable bearing-blocks 104, in which the ends of the shaft of the roll 96 are journaled, and above said roll is suitably supported a rock shaft or rod 105, connected by toggle-links 106 and 107 with the ends of the shaft of the roll 96 and provided at one end with an operating knob or handle 108, this construction permitting of the vertical adjustment of the roll 96 in an obvious manner.

It will be apparent from the foregoing description that through the medium of the recording mechanism the music or record sheet representing a selection or musical composition played by the performer upon the piano in the usual way by the manual manipulation of the piano-keys may be made and that then by transferring the music-sheet to the rolls of the reproducing device the latter may be made to operate the keys to mechanically produce such selection or composition in true accordance with the touch and player's rendition or interpretation of the composition. It will also be apparent that while the reproducing apparatus is in operation to mechanically actuate the piano the recording apparatus may be operated to form a duplicate of the actuating-record, and that by continuously operating the reproducing mechanism any number of duplicates of the record carried thereby may be made through the action of the recording mechanism. As shown in Fig. 10, the respective rolls 52 and 93 of the recording and reproducing mechanism are mounted upon a common shaft 109, which may be provided at one end with a pulley 110, (see Fig. 1,) whereby the two mechanisms may be simultaneously operated by an auxiliary motor. I have also provided means whereby said mechanisms may be manually operated, as will be hereinafter described.

In order to permit the apparatus to be thrown into and out of operation at will and to be adjusted to suit the positions of the piano-key levers, which especially in old pianos may be out of true alinement and have different degrees of movement, means are provided for properly positioning and regulating the strokes of the respective valve-controlling lever 34 to compensate for variations in the relative operative levels of the plungers and for locking the parts in adjusted position, such means also permitting any necessary upward adjustment of a plunger to accord with the changed position of the valve-controlling lever coöperating therewith. It will be understood that the keys of different makes of instruments have different ranges of movement and that the levels of the keys of an instrument vary through wear and other causes after the instrument has been some time in use, thus rendering it necessary to vary the relative operative levels of the plungers and valve-controlling levers 34 in applying the apparatus to an old piano and in shifting it from one piano to another. Where the link 46 has a loose pivotal connection with the plunger and the operative level of the latter must be varied, it is obvious that the change of adjustment of the plunger to a higher operative level cannot be secured without adjusting the lever 34, as upward movement of the plunger would be restrained by the link 46, and consequently the plunger would not be set with proper relation to its key and to the coöperating valve mechanism. Hence where the adjustment of the plunger to a higher operative level is necessary in the use of such a pivotal connection between the plungers and associated valve-controlling levers means must be provided to enable the relative operative levels of the levers to be varied, through which operation adjustability of the plungers is secured. As heretofore described, the brackets 37, which carry the levers 34, are adjustably mounted in guide-ways 38, which are arranged opposite a bar 39, spaced from and disposed parallel with said brackets. Disposed between the bar 39 and brackets 37 of all of the valve-controlling levers is a longitudinally-sliding locking-bar 111, provided opposite each bracket with a cam or wedge surface 112, adapted to engage a reversely-beveled wedge block or surface 113 on the bar 39. The locking-bar 111 is provided at intervals with guide-slots 114 to coöperate with stationary guide-pins 115 extending therethrough, one of said slots and guide-pins being shown in Figs. 8 and 9, which illustrate the bar 111 in unlocking and locking positions. The pins 115 also limit the inward movement of the locking-bar 111, which is provided at one end with an operating knob or handle 116, extending to the exterior at one end of the casing 11, whereby said locking-bar may be adjusted in and out to clamp the brackets 37 in the guideways 38. When the apparatus is applied to the piano, the locking-bar 111 is drawn outwardly to release the brackets 37 and permit the plungers 47 and levers 34 to accommodate themselves to the relative heights or levels of the keys 2, after which the bar 111 is forced inward to lock all of said brackets 37 in adjusted position. This operation, it will be apparent, effects the adjustment of the plungers 47 to suit any variation in the keys and positions the levers 34 for operation accordingly. A shifting bar 117 is arranged in rear of the bar 39 and is pivotally connected thereto by links 118, and to one end of the said bar 117 is connected an operating knob or lever 119, which extends to the exterior of the casing 11 at a point in convenient juxtaposition to the knob 116. When the handle 119 is forced inward, the links 118 will lie in an inclined position, as shown in dotted lines in Fig. 7, thus positioning the bar 117 below the rear ends of the levers 34; but when the handle 119 is pulled outward the links 118 will be straightened to a vertical position, as indicated in full lines in Fig. 7, thus elevating the bar 117, which will thereupon engage the rear ends of the levers 34 and raise all the levers to a corresponding level and act as a stop to maintain the parts of the valve mechanism in normal position, thus preventing actuation of such mechanism and eliminating the resistance of the springs 35' to the upward movement of the keys, as when the levers 34 are so held from movement, the upward movement of the keys after depression will be resisted only by the plunger-springs 29. Also as a result of the valve-levers 34 being held in a raised position by the bar 117 the "touch" of the action remains normal, because the springs 35' no longer depress the plungers upon the keys. The keys are therefore left to be depressed manually against their springs in the ordinary manner. It will be understood, of course, that this adjustment is best obtained by first moving the locking-bar 111 to unlocking position, and then adjusting the bar 117 into projected position so that the brackets 37 will be free to permit the levers 34 to be lifted to the desired extent. When the locking-bar is released, the brackets 37 are free to descend by gravity in their guideways or to be manually adjusted up or down therein by the operator, and after they have been properly adjusted all the brackets may be simultaneously locked in adjusted position by projecting said locking-bar. It will be understood, of course, that where downward adjustment of the plunger is required to bring it into operative contact with a key which is depressed below the normal level such adjustment is secured automatically by the downward movement of the key by the spring 49, thus rendering the operation partially automatic, but that a compensating adjustment of the lever 34 must be made through the provided means. When an upward movement of the plunger is necessary to set it to bear properly upon the underlying key under the upward pressure of the key against the tension of the spring 49 in the movement of the key to normal position, the primary freeing of the levers 34 and brackets 37 for adjustment is essential, as any upward movement of the plungers beyond a determined degree is limited by the link 46.

It will be understood from the foregoing description, considered in connection with the drawings, that when the rear ends of the levers 34 are elevated the bails 46 will be elevated out of contact with the shoulders 46$^a$ of the plungers, thus permitting the latter to move freely without interference therefrom under the action of the bellows of the reproducing mechanism. Such elevation of the rear ends of the levers also renders the recording mechanism inoperative without interfering with the action of the plungers by the reproducing mechanism, whereby the piano may be manually or mechanically played without operating the valves of the recording mechanism, and thereby causing waste of air and wear upon the parts thereof. When the brackets 37, carrying the series of levers 34, are adjusted in their guideways to raise or lower said levers, the plungers are permitted in an obvious manner to adjust themselves automatically to the levels of the keys. After such adjustment of the plungers the levers 34 may be manually adjusted to set the bails 46 for proper operative engagement with the plungers and then locked in adjusted position, so that the apparatus will operate efficiently irrespective of the varying ranges of movement of the respective keys.

The driving mechanism for the rolls of the recording and reproducing devices comprises a drive-shaft 120, extending at right angles to the rolls and provided at the front of the casing 11 with an operating crank or handle 121 and connected by a belt 122 with a counter-shaft 123, carrying a beveled pinion 124, meshing with a like pinion 125 on the shaft 109, whereby when the crank 121 is turned to the right motion will be communicated to the shaft 109 to turn the rolls 52 and 93 forwardly. If desired, the shaft 120 may be operatively connected by a belt 126 and suitable gearing with the rear roll of the recording mechanism. An auxiliary drive-shaft 120' also extends to the front of the casing and is provided with an operating crank or handle 127 and is connected to the primary drive-shaft 120 by a belt 120$^a$. Suitable clutch connections may be employed for rendering the driving mechanism operative to drive the rolls of the recording and reproducing mechanisms independently or simultaneously. The operating-crank 121 is primarily designed for operating the rolls of the recording mechanism when a finished performer is playing for the production of a record, an assistant to the pianist of course turning the crank while the pianist is playing. The said crank 121 is preferably arranged at the right of the center of the casing in order to enable it to be manipulated by the assistant without interfering with the motion of the hands and arms of the pianist. The crank 127, on the other hand, is arranged at the left of the center of the instrument and is designed to enable an unskilled performer to feed the sheet forward by turning the crank 127 with the left hand, while manipulating the keys by the fingers of the right hand to prepare a record in a manner hereinafter described.

The sliding frame 59, supporting the reproducing devices, is attached to a rack-bar 128, which meshes with an adjusting-pinion 129, carried by a revoluble operating rod or stem 130, whereby the said frame 59 may be shifted in one direction or the other within the range of an octave to play the composition in any key. To effect a change in the playing of the composition, it will be understood that the music-sheet carried by the rolls of the reproducing mechanism is not shifted with the frame 59, but the roll 96 is elevated through the medium of its adjusting means, before described, to permit the reproducing-needles 55 to be shifted with said frame without coming in contact with and tearing or injuring the sheet. Assuming that the needle 55 of any one of the reproducing devices is in position to register with the key-note of the composition represented by its designating perforation in the music-sheet 54, it will be readily understood that the key may be changed by shifting the frame 59 to bring the needle of the next adjacent reproducing device of any of the reproducing devices to the right or left of the plane of the perforation within the range of adjustment into alinement with said perforation, so that the perforation instead of effecting the depression of the piano-key in which the composition represented by the sheet is recorded will operate the corresponding key of the octave above or below or any intermediate key to play the composition in a higher or lower key. The extent to which the frame 59 is adjusted is designated upon the exterior of the casing by indicating means comprising a cord 131, connected at one end to the rack-bar, passing intermediately over a guide-pulley 132 and connected at its opposite end to a grooved pulley 133. The pulley 133 is mounted upon the inner end of a hollow shaft 134, which is connected to one end of a coiled retracting-spring 135, the opposite end of which is fixed to a stationary block or frame-piece 136. The shaft 134 extends to the exterior through the front wall of the casing and into an indicator-casing 137, having a transparent panel 138, which indicator-casing is fixed to the front wall of the casing 11. Attached to the outer end of the shaft 134 is a small hand or pointer 139, adapted to traverse a scale 140 on a dial-plate 141, formed by the rear wall of said casing 137. The hand 139 normally projects vertically upward from the shaft and registers with the zero-point of the scale 140 and is actuated in one direction or the other by the rack-and-pinion mechanism and the spring to indicate the degree of movement of the frame 59 to the right or left, the scale designations being arranged to indicate the distances between keys, so as to accurately indicate the movement of the frame 59 to the right or left the distance of one or more keys, by which means the reproducing mechanism may be accurately adjusted, through the medium of the operating device 30, to play in any key within its range of adjustment.

Extending through the shaft 134 is a center shaft 141$^a$ and an intermediate hollow shaft 142, the shaft 142 also projecting into the casing 137 and carrying a large indicating hand or pointer 143, adapted to traverse a scale 144 on the dial-plate 141, said scale extending in the form of a ring around the dial and being suitably divided off to indicate a full beat or measure and fractions thereof, whereby the extent to which the sheet on the rolls of the recording mechanism should be fed forward to form a perforation of proper length for an eighth, quarter, half, or a full note may be determined. The zero-point of the scale 114 is the highest point thereof, and the pointer 143, as will be understood, normally projects vertically above the shaft 142, or any other suitable arrangement may be employed. The shaft 142 carries at its rear end a fixed friction-disk 145, adapted to be engaged by a friction-disk 146 on a knob-operated shaft 147. The shaft 147 is journaled at its forward end in the front wall of the casing 11 and at its rear end in a bearing 148, between which and the disk 146 is a coiled spring 149, which normally projects the shaft 147 outward or forward, with the disk 146 out of engagement with the disk 145. The central shaft 141$^a$ is connected at its inner or rear end by a belt 150 and suitable pulleys with the counter-shaft 123, whereby said shaft 141$^a$ will be revolved when the driving mechanism which actuates the rolls is operated. At its forward end the shaft 141$^a$ is split or expanded to frictionally engage the intermediate shaft 142 to connect it with said shaft 142 in such manner that when the shaft 142 is rotated it may turn loosely on the shaft 141$^a$ to adjust the hand or pointer 143 without affecting the roll 53 and so that when the shaft 141$^a$ is turned by the belt connection 150 both it and the shaft 142 will rotate in unison to turn the hand 143. I have not deemed it necessary to show this friction connection in detail, as such a connection is common in watch and clock movements.

It will thus be understood that during the playing of a composition by a pianist for the production of a record-sheet the hand or pointer 143 will rotate to indicate the time in which the composition is being played. This action of the pointer 143 may be employed for purposes of reference by the performer, if desired, to determine whether or not the piece is being played in correct time; but the movement of the pointer may be ignored by a performer desiring to give his or her interpretation of a composition or masterpiece. The pointer 143 is, however, primarily designed as a means by which an unskilled performer or one familiar with music but unable to play a piano may nevertheless produce an accurate record for reproduction of any musical composition. This is carried out in the following manner: The pointer is adjusted to the zero position, and then the performer while turning the crank 127 to feed the paper forward successively depresses the keys of the piano representing the musical notes of the composition of which a record is to be made. If the first note happens to be a half-note, the performer will hold the key depressed until the hand 143 makes a complete half movement around the dial 144. If the next note is a quarter-note, the key is held depressed until the hand reaches the three-quarter position on the dial, and so on, it being understood that the hand 143 may be adjusted back to the zero position at any time by the performer for convenience in enabling its degree of movement to be clearly determined through the medium of the shaft 147 and the friction-gearing while the drive-gearing of the rolls is at rest without in any manner affecting said drive-gearing or the position of the music-sheet. As each note is held down a definite length of time, as accurately indicated by the pointer and scale, it will be clearly understood that a slot or perforation of the proper length will be formed in the feeding record-sheet. In such manner the soprano part of a composition may be first recorded and the parts readjusted back to the starting-point to successively record the bass, tenor, &c., and any extras not in the composition it is desired to incorporate, whereby a mathematically-correct record-sheet will be produced.

The conveniences and advantages of my invention will be readily understood by those conversant with the musical art. It provides a device by which a skilled or unskilled performer may prepare a musical sheet or record of any composition and any number of duplicates thereof and employ the same to mechanically operate the piano for a reproduction of the composition as recorded. The apparatus thus not only affords pleasure and amusement and enables home records to be conveniently and inexpensively made, but the compositions when reproduced will disclose to the performer any errors that may have been made, thus rendering the apparatus of great value as an educator. By means of the recording apparatus an accurate record of any composition played by the performer or master in exact accordance with his touch or intrepretation of the music may be made, and any desired number of duplicates may be produced. Furthermore, the apparatus may be conveniently regulated to play an air or composition in any key regardless of the one in which it was recorded and may be thrown into and out of use at will, so that by a simple adjustment of controlling the parts the key-levers may be left free for manual manipulation for the playing of the piano in the ordinary way.

The supporting and guide rollers of the record-making and reproducing mechanisms are preferably arranged, respectively, as shown, in housings 151 and 152, superposed upon the casing 11, with the upper rolls 94 and 95 of the reproducing mechanism arranged above the housing 152 to effectively support the record-sheet in the manner shown in Fig. 19. Adjustable pressure-rollers are respectively provided in the two housings to respectively hold the sheet in frictional contact with the rolls 52 and 93, said rolls being adjustable through the medium of means controlled by exteriorly-projecting knobs or operating devices 153 and 154. In Fig. 20 I have shown the pressure-roller 155 of the reproducing mechanism and the adjusting means therefor, and as both pressure-rollers are constructed and mounted in like manner a description of one will suffice for both. The roller 155 is journaled in bearings 156, arranged to slide in vertical guideways 157 to adjust said roller toward and from the driving-roller 93. A bar 158 connects the bearings for movement in unison and is connected by links 159 with an operating-rod 160, slidable in fixed guides 161, and to the outer end of which the knob 154 is attached. Thus by sliding the rod in and out the roller 155 may be moved toward or away from the roller 93, whereby the frictional contact of the sheet with said roller 93 may be increased or diminished to cause the sheet to travel under the action of the driving-roller or to bring it to a state of rest without stopping said roller.

Having thus described the invention, what is claimed as new is—

1. In combination, a piano, a record-making mechanism including a series of recording devices and pneumatic operating mechanism therefor, elements controlled by the manual manipulation of the keys for governing said pneumatic mechanism, and a reproducing mechanism having pneumatic means for actuating said elements to mechanically manipulate the keys.

2. In combination, a piano, record-producing means controlled by the piano-action, reproducing means adapted to be controlled by the produced record for mechanically operating the piano-action, and means for automatically and simultaneously operating the record-producing means with the reproducing means for the production of a duplicate of the record.

3. In a combined record-making and self-playing appliance for pianos, record-making mechanism controlled by the piano-keys, reproducing mechanism adapted to be operated by a record produced by the record-making mechanism to effect the mechanical operation of the keys, and means for throwing the record-making mechanism into and out of operation independent of the reproducing mechanism.

4. In a combined record-making and self-playing attachment for pianos, record-making mechanism, self-playing mechanism, said mechanisms including controlling elements operative by the manual manipulation of the keys to control the record-making mechanism and by the action of the self-playing mechanism to mechanically actuate the keys, and means for throwing said controlling elements into and out of operative relation to the keys.

5. In a combined record-making and self-playing attachment for pianos, record-making mechanism, self-playing mechanism, pneumatically-controlled operating means for said mechanisms, and members controlling and controlled by said pneumatic operating means, said members being governed by the manual manipulation of the keys to effect the actuation of the pneumatic operating devices of the record-making mechanism and by the pneumatic devices of the self-playing mechanism to actuate the piano-keys.

6. In an apparatus of the character described, and in combination with the keys of a piano, a series of plungers resting upon the keys, recording mechanism including a series of recording devices, pneumatic means for actuating said recording devices, said means including governing-valves and pivoted operating-levers therefor, said levers having a loose pivotal connection with the plungers, spring means for depressing the plungers and operating the levers to open the valves upon the downward movement of the keys, the latter serving to maintain the plungers and levers in normal position against the pressure of the said spring means, and a reproducing mechanism including pneumatically-controlled devices connected with the plungers for forcibly depressing the same to mechanically manipulate the piano-keys.

7. In a combined record-making and self-playing attachment for pianos and in combination with the keys of the piano, a series of plungers, a series of recording devices, pneumatic means for actuating said devices, valves controlling said pneumatic means, pivotally-mounted levers controlling said valves, said levers being loosely connected with the plungers, springs for depressing the plungers and operating the levers to open the valves upon the manual depression of the keys, said plungers being normally held by the keys from movement so as to restrain the levers from movement, a reproducing mechanism including pneumatically-controlled actuating devices for mechanically depressing the plungers, and means adapted to be thrown into operation to hold the levers from movement when the plungers are depressed.

8. In an apparatus of the character described, a series of vertically-movable plungers, springs for depressing the same, pivotally-supported valve-actuating levers, loose controlling connections between the levers and plungers, whereby the levers are normally held in valve-closing position, springs for moving said levers to valve-opening position when the plungers are depressed, a series of recording devices, pneumatic means for operating the same including valves controlled by said levers, and means for vertically adjusting the valve-levers.

9. In an apparatus of the character described, a series of vertically-movable plungers, springs for depressing the same, pivotally-supported valve-actuating levers, loose controlling connections between the levers and plungers, whereby the levers are normally held in valve-closing position, springs for moving said levers to valve-opening position when the plungers are depressed, a series of recording devices, pneumatic actuating means therefor controlled by the valves, and means for vertically adjusting the levers.

10. In an apparatus of the character described, a set of sheet-perforating devices, a set of reproducing devices controlled in action by perforations in a music-sheet, pneumatic operating means for the sheet-perforating devices, a set of elements movable when the keys are manually manipulated to control said pneumatic operating means, and pneumatic means controlled by the action of the reproducing devices to actuate said elements to mechanically manipulate the keys.

11. In a record-making and self-playing attachment for pianos, the combination of a recording mechanism including a series of recording devices, a series of plungers controlled by the keys, pneumatic means controlled by the movement of the plungers when the keys are manually manipulated to actuate the recording devices, a reproducing mechanism comprising a series of reproducing devices, pneumatic means controlled by said devices for actuating the plungers to mechanically manipulate the keys, sheet supporting and feeding devices associated with the recording and reproducing mechanisms, and means for operating said devices in unison.

12. In an apparatus of the character described, and in combination with the keys of a piano, a series of plungers associated with the keys, a pneumatic record-making mechanism having controlling-valves, levers controlling said valves, adjustable supports for the levers, means for simultaneously locking said supports in adjusted position, loose pivotal connections between the plungers and levers, and springs for operating said plungers and levers when the keys are manually depressed.

13. In an apparatus of the character described, and in combination with the keys of a piano, plungers controlled by said keys, a pneumatic record-making mechanism having controlling-valves, adjustable levers governing said valves, and connected with and controlled by the plungers, means for fixing the set of levers in adjusted position, springs for moving the plungers and levers when the keys are manually depressed, and means for holding the levers from movement against the action of their springs.

In testimony whereof I affix my signature in presence of two witnesses.

GOTTLIEB MOHR.

Witnesses:
JAS. A. BUTUTEN,
CAL. NORMAN.